(No Model.) 3 Sheets—Sheet 2.

T. H. SPRINGER.
CENTRIFUGAL LIQUID SEPARATOR.

No. 531,880. Patented Jan. 1, 1895.

Witnesses
Horace L. Deitz
W. H. Pumphrey.

Inventor
Thomas H. Springer,
by Geo. H. Holgate
his Attorney (No Model.) 3 Sheets—Sheet 3.

T. H. SPRINGER.
CENTRIFUGAL LIQUID SEPARATOR.

No. 531,880. Patented Jan. 1, 1895.

Witnesses

Inventor
Thomas H. Springer,
by Geo. H. Holgate
his Attorney

UNITED STATES PATENT OFFICE.

THOMAS H. SPRINGER, OF PHILADELPHIA, PENNSYLVANIA, ASSIGNOR OF ONE-HALF TO GEORGE H. HOLGATE, OF SAME PLACE.

CENTRIFUGAL LIQUID-SEPARATOR.

SPECIFICATION forming part of Letters Patent No. 531,880, dated January 1, 1895.

Application filed November 8, 1894. Serial No. 528,205. (No model.)

*To all whom it may concern:*

Be it known that I, THOMAS H. SPRINGER, a citizen of the United States, residing at Philadelphia, in the county of Philadelphia and State of Pennsylvania, have invented certain new and useful Improvements in Scum or Dirt Arresters for Centrifugal Separators; of which the following is a specification.

The invention relates to scum or dirt arresters for centrifugal separators.

The object is to produce a device by which clogging or choking, by deposit and accumulation of foreign substance at and around the outlets of the bowl of a separator, will be prevented and a flow of liquid therethrough maintained continuous, by being rendered free and unobstructed.

With this object in view, the invention consists in certain novel constructions and arrangements of parts to be hereinafter described and claimed.

In the accompanying drawings, forming part of this specification, similar letters indicate corresponding parts in the several views.

Figure 1:
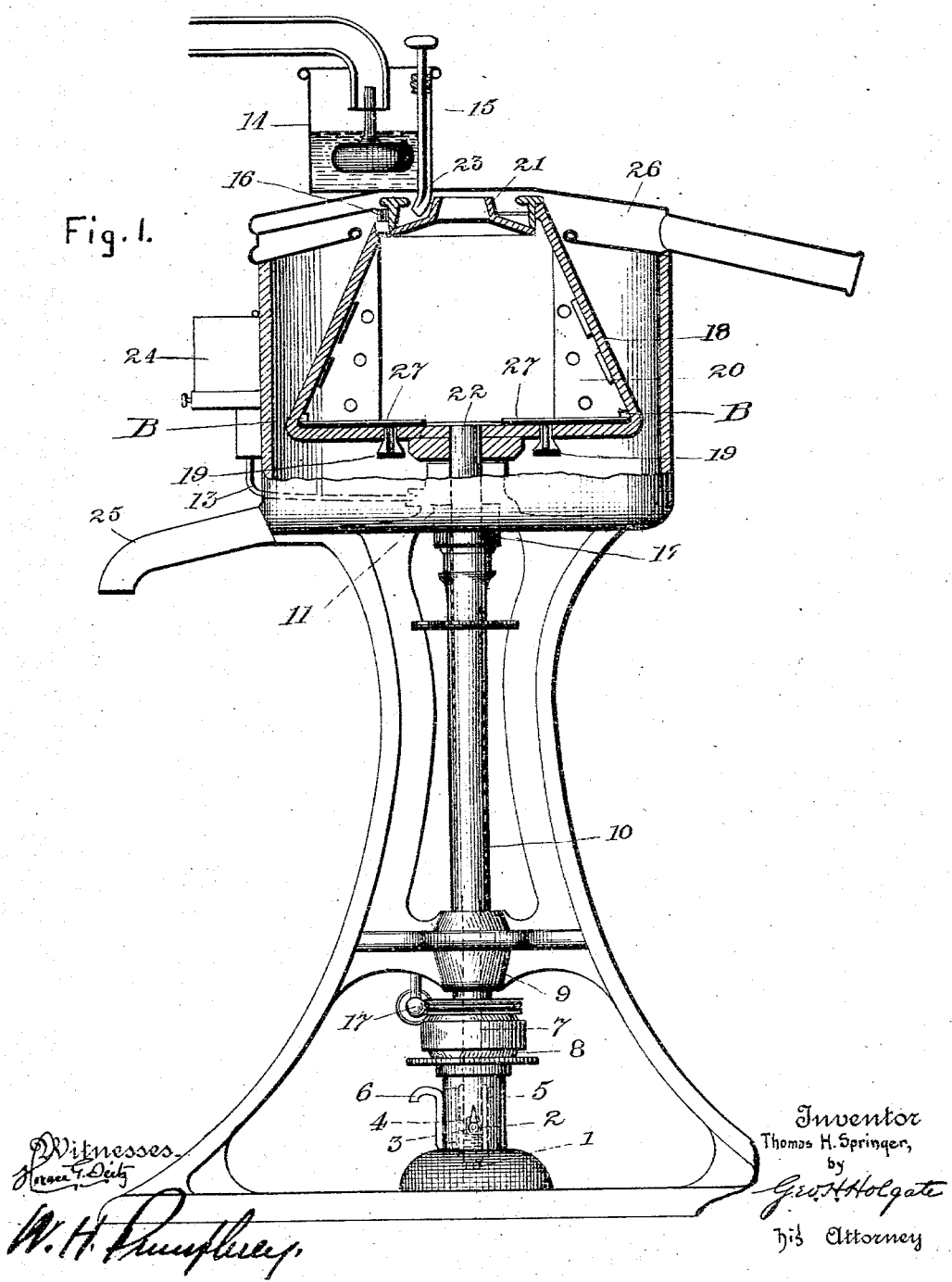
Figure 2:
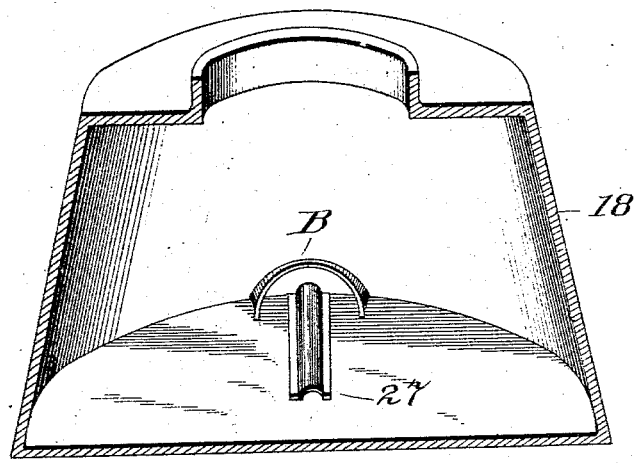
Figure 3:
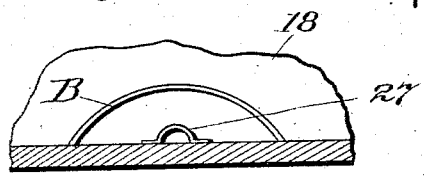
Figure 4:
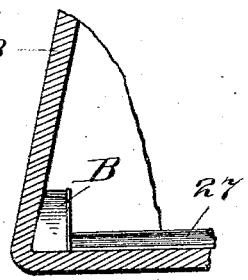
Figure 5:
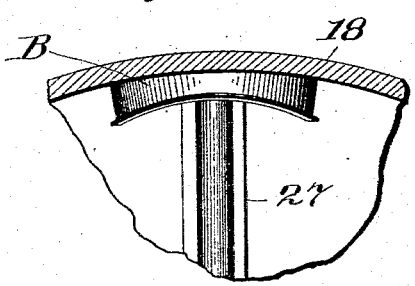
Figure 6:
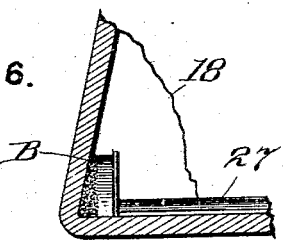
Figure 7:
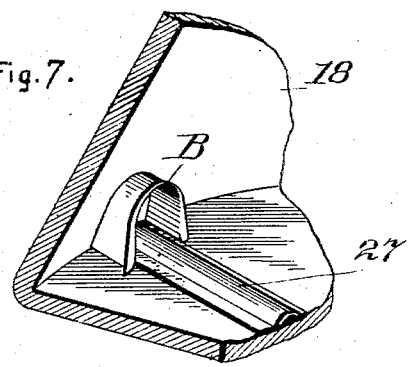
Figure 11:
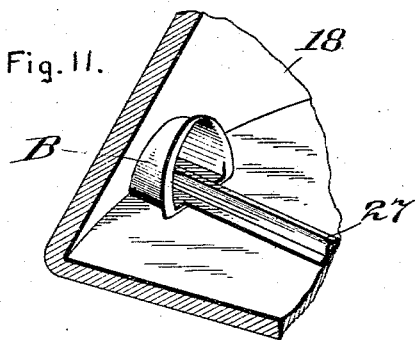
Figure 8:
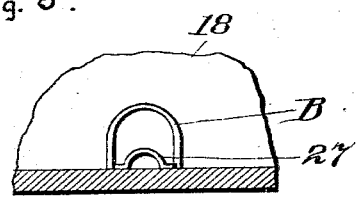
Figure 12:
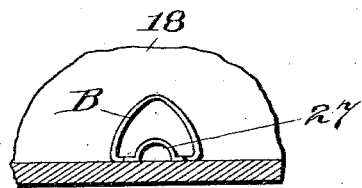
Figure 9:
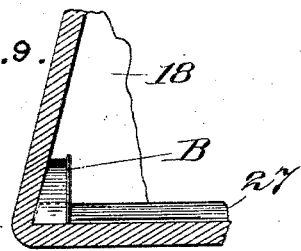
Figure 13:
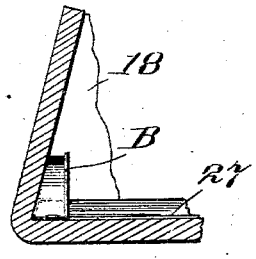
Figure 10:
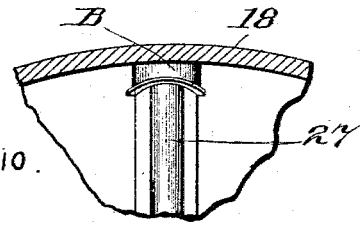
Figure 14:
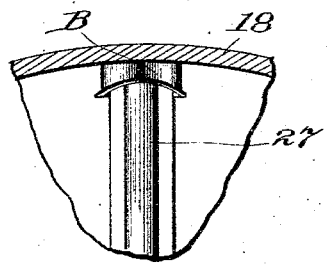

Figure 1, is a view in central vertical section, of a centrifugal separator, showing one embodiment of the invention applied. Fig. 2, is a sectional view, in perspective, of the bowl of a centrifugal separator, the invention being applied, and showing more clearly its relative position with respect to the skim milk outlet tube. Fig. 3, is a detail view in front elevation of the arrester applied. Fig. 4, is a similar view in side elevation. Fig. 5, is a top plan view thereof. Fig. 6, is a sectional view, in detail, showing the accumulation of sediment within the bowl. Fig. 7, is a fragmentary view, showing a modified form of arrester. Fig. 8, is a view in front elevation of the same. Fig. 9, is a view in side elevation of the same. Fig. 10, is a top plan view thereof. Fig. 11, is a detail view in perspective of a further modification. Fig. 12, is a view in front elevation of the same. Fig. 13, is a view in side elevation, and Fig. 14, is a top plan view thereof.

In the drawings: A, represents a centrifugal separator, which is here employed for purposes of illustration only, and forms no part of the present invention. This machine comprises the following parts: First, screw plug by means of which the height of the bowl is regulated; second, steel pin step on which the steel ball rests and revolves; third, steel ball on which the weight of both spindles and the bowl rests; fourth, steel pin in the lower end of the lower spindle, that rests on the ball; fifth, bush to the lower bearing for the lower spindle; sixth, oil tube where the waste oil is discharged (lower oil tube); seventh, lower spindle; eighth, pulley through which the speed is transmitted to the bowl; ninth bush to the upper bearing for the lower spindle; tenth, case around the upper spindle that carries the oil down to the lower bearings, and keeps milk, water and dust from them, with shield; eleventh, rubber ring that steadies the bowl; twelfth, neck bearing, complete four parts; thirteenth, oil tube that conducts the oil from the cup on the side to all the bearings below; fourteenth, receiving regulator feed can; fifteenth, regulating pin that regulates the flow of milk from the pan into the machine; sixteenth, adjustable cream delivery for regulating density of cream; seventeenth, speed indicator, which may be applied any time while the machine is in motion; eighteenth, large bowl; nineteenth, skim-milk pipe leading out of the bowl; twentieth, wing on the inside of the bowl to cause the milk to revolve with the bowl; twenty-first, new milk feeding rim; twenty-second, main spindle to the bowl; twenty-third, inlet tubes from the feed regulating rim into the feeding rim; twenty-fourth, oil cup that supplies oil to all parts of the machine; twenty-fifth, skim-milk discharge from the machine; twenty-sixth, cream pan that receives the cream as discharged from the bowl; twenty-seventh, exit tubes for skim milk.

B, represents a scum and dirt arrester, which, in its preferred form, consists of a band of metal bent up into a curve, approximating a semi-circle or quadrant, and is adapted to be so placed, by being rigidly secured against the inner wall of the bowl, as to form an arch over or around the inlet ends of the skim milk exit tubes and thereby serve as a deflector, shield or arrester in preventing deposit and accumulation of foreign substance at the outlets.

In the use of machines of this class, it is well-known that the accumulation is mainly at the bottom, around the inner wall of the bowl, where it becomes a solidly packed mass.

The feed being downward from the top of this bowl, the new milk is at once caught by the whirling liquid within the bowl, and thereupon, the contained foreign substance becomes immediately separated and forced outward against the wall of the bowl. By reason of the peculiar slope of this wall, also owing to the action of gravity, this substance is driven or worked downward toward the bottom of the bowl, where it is deposited and accumulates, to form a vertically faced annulus, as shown in Fig. 5. To secure the greatest possible effect, and without interfering with the free and unobstructed outflow of the skim milk, it becomes essential that the shape of the arresters should be such, as to correspond as nearly as practicable, to the cross section of this deposited annulus, and to effect this, the metal band from which each arrester is made, is of a width sufficient to extend from the wall of the bowl inward beyond the inlet end of the skim milk tube, it being reduced in width, centrally, to allow for the free entrance of milk into the exit tube. As a further protection against the entrance of foreign substance in or near the inlet ends of the skim milk tubes, the inner edge of the band may, if found desirable, be turned up to form a flange.

The curve of the arch may be varied to suit the requirements of machines of different construction, as it will be at once obvious, that tubes varying in diameter will require a corresponding variation in the form of arrester. At times, it may also be desirable to employ a band of greater length, in constructing the arrester, so that the extremities can be turned inward against the exit tube, as is clearly shown in Figs. 3 and 4, and the detail views thereof.

Prominent among the many and important advantages of this invention may be mentioned, its extreme simplicity of construction, it being formed from a plain rectangular strip or band of metal, which may be readily bent by hand to the proper curve, and therefore, does not require to be hammered, pressed or stamped into shape, except for the flange at the inner edge, which may be dispensed with when desired. Further, in maintaining the output constant and continuous, the machine may be run for a much greater length of time without necessitating a thorough washing, as is now required after two or three hours' run; and further, in preventing deposit and accumulation at the inlet end of the skim milk exit tubes, the capacity of the machine is thereby increased, as has been demonstrated by actual tests.

Having fully described my invention, what I claim as new is—

1. The combination with a liquid separator, of a scum and dirt arrester formed by arching a band or strip around the inlet end of the outlet pipe of the bowl of the separator, the width of the band being reduced centrally, for the purpose described.

2. The combination with a centrifugal liquid separator, of a scum and dirt arrester, consisting of a band or strip bent into a curve and rigidly secured to the inner wall of the bowl of the separator in a manner to become arched over the inlet end of the skim milk outlet pipe, the width of the band being reduced centrally, for the purpose described.

3. In a liquid separator, the combination with a skim milk exit tube, of a scum and dirt arrester, consisting of a band or strip reduced in width centrally, and bent into a curve approximating a semi-circle, and rigidly secured to the inner wall of the bowl in a manner to become arched around the inlet end of the skim milk exit tube, for the purpose described.

4. In a liquid separator, the combination with a skim milk exit tube, of a scum and dirt arrester formed by bending up a band or strip and securing it to the inner wall of the bowl of the separator in a manner to form an arch around the inlet end of the tube, the width of the band being reduced centrally and extending inward from the wall of the bowl beyond the inlet end of the exit tube, for the purpose described.

5. The combination with a liquid separator, of a scum and dirt arrester, formed by arching a flanged band or strip, centrally reduced in width, around the inlet end of the skim milk outlet pipe of the bowl of the separator, for the purpose described.

6. The combination with a centrifugal separator, of a scum and dirt arrester, formed by arching a strip or band around the inlet end of the outlet pipe of the bowl of the separator, the width of the strip being reduced centrally and the extremities thereof turned inward and secured upon and adjacent to the tube, for the purpose described.

In testimony whereof I have hereunto affixed my signature in the presence of two subscribing witnesses.

THOMAS H. SPRINGER.

Witnesses:
W. H. PUMPHREY,
GEO. A. HINCKEN.